United States Patent
Lamy

[11] 3,846,988
[45] Nov. 12, 1974

[54] SWELL DAMPER

[75] Inventor: Jacques Edouard Lamy, Fontenay-aux-Roses, France

[73] Assignee: C. G. Doris (Compagnie Generale pour les Development Operationnels des Richesses Sous-Marines), Paris, France

[22] Filed: May 9, 1973

[21] Appl. No.: 358,500

[30] Foreign Application Priority Data
May 10, 1972 France.............................. 72.16869

[52] U.S. Cl. .................................................. 61/3
[51] Int. Cl............................................ E02b 3/06
[58] Field of Search ........................... 61/3, 4, 5, 37

[56] References Cited
UNITED STATES PATENTS

| | | | |
|---|---|---|---|
| 1,371,119 | 3/1921 | Scott........................................ | 61/3 |
| 3,011,316 | 12/1961 | Wilson................................... | 61/5 X |
| 3,118,282 | 1/1964 | Jarlan..................................... | 61/4 |
| 3,387,458 | 6/1968 | Jarlan..................................... | 61/3 |

Primary Examiner—W. C. Reynolds
Assistant Examiner—Philip C. Kannan
Attorney, Agent, or Firm—Wigman & Cohen

[57] ABSTRACT

A device for providing protection against swells, in which there is provided a curtain formed between a volume of water in which the swell develops and a structure or a zone requiring protection, the curtain has its base immersed in the volume of water concerned and its top located advantageously above the crest of the highest waves occuring in the volume of water, and offers, for the passage of the water, ducts which have a profile flared towards the structure or zone being protected, with a sufficiently steep gradient of section for the water to break away from the walls of the ducts and produce eddies which dissipate the water energy.

20 Claims, 12 Drawing Figures

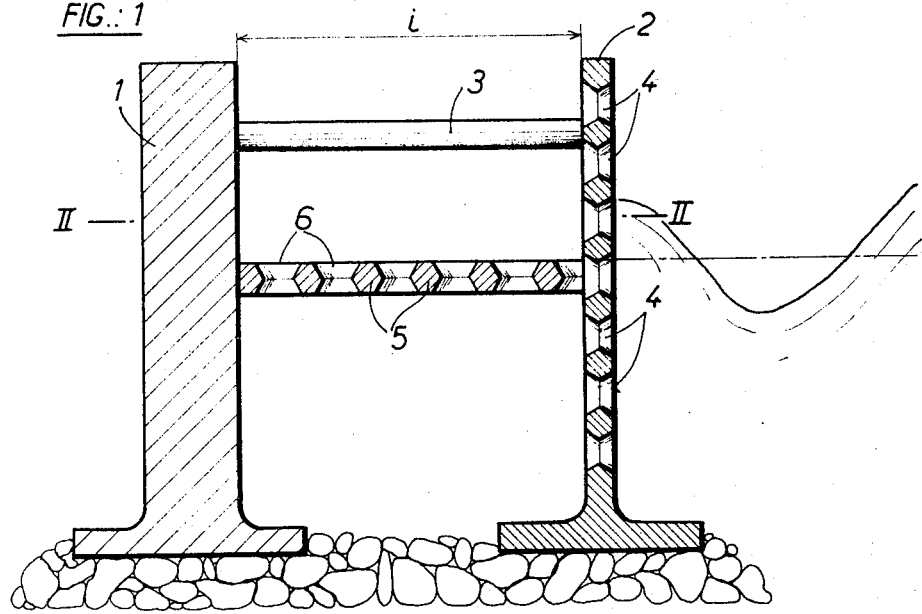
FIG.: 1
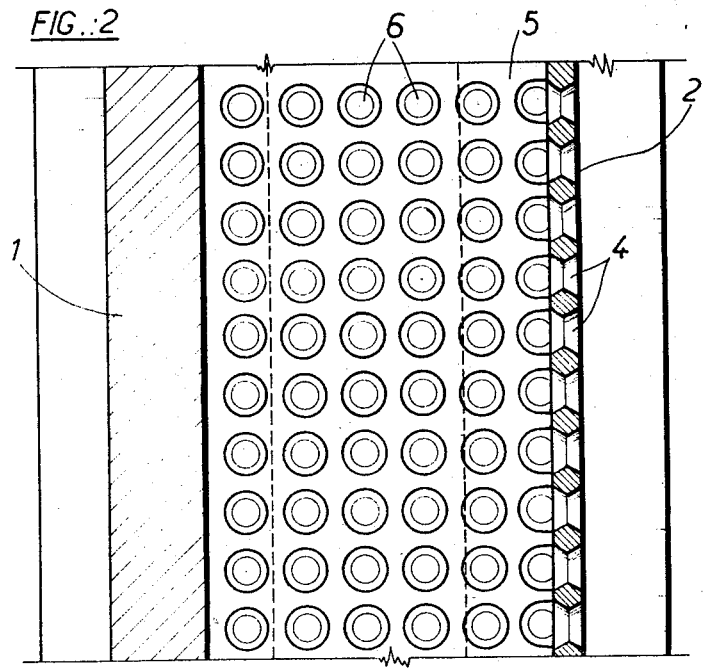
FIG.: 2

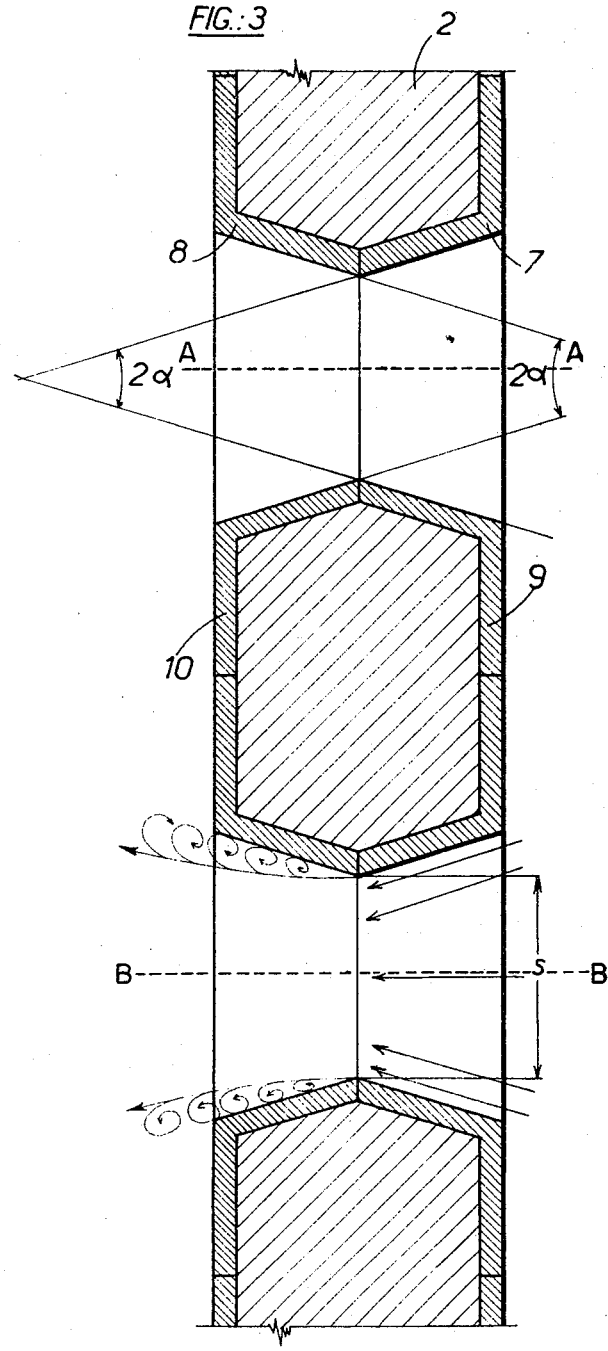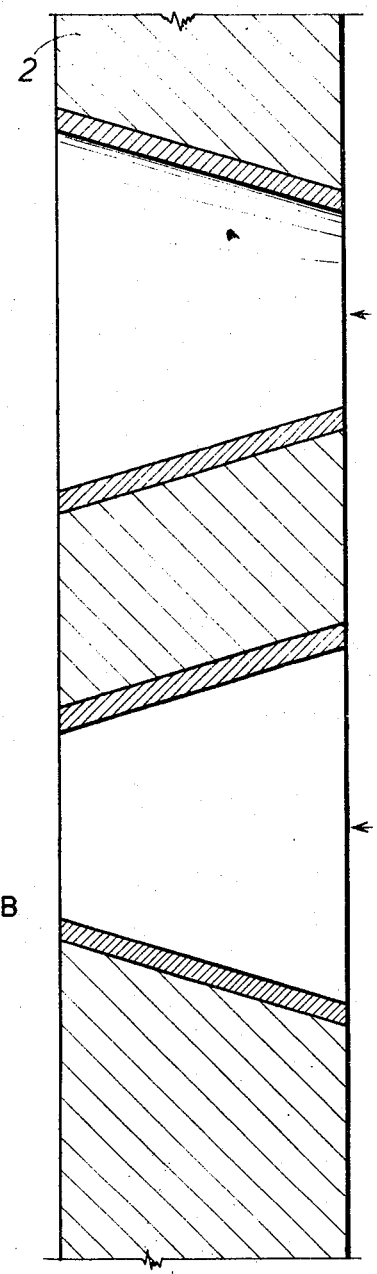

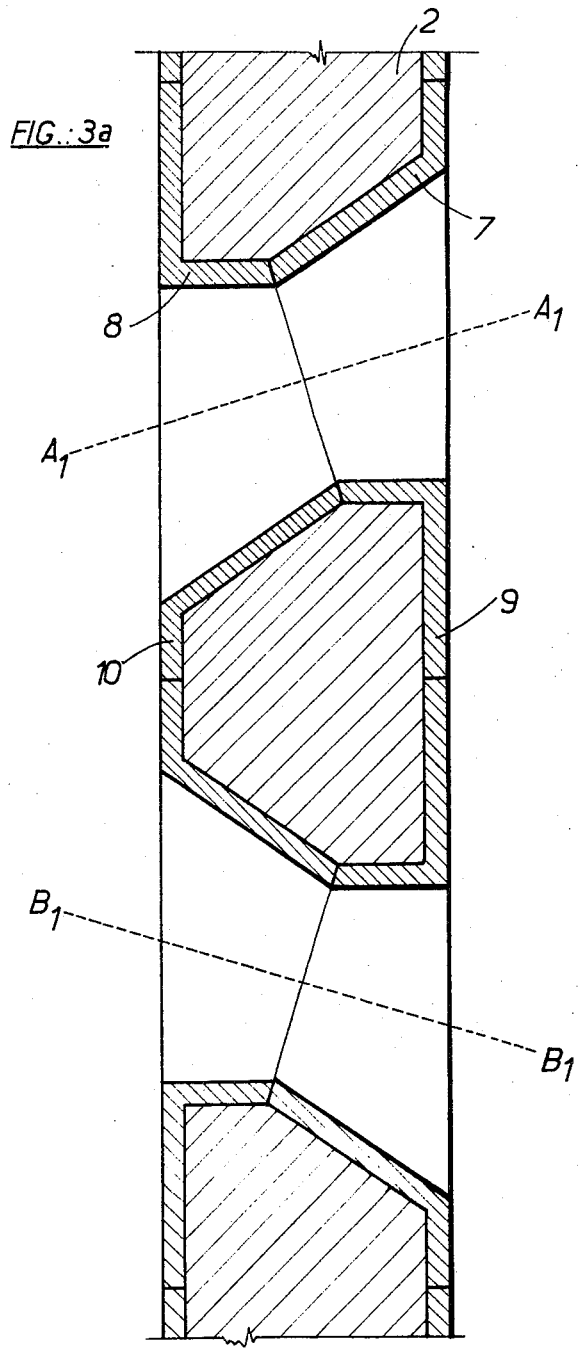
FIG.: 3a

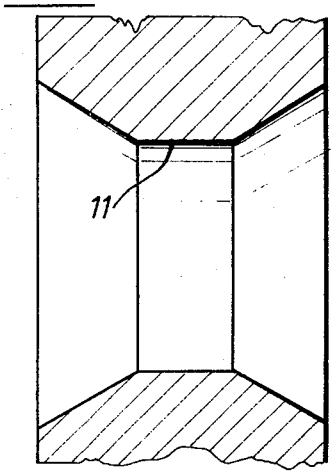
FIG.: 5
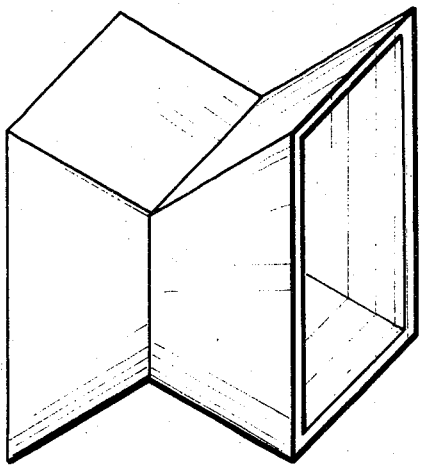
FIG.: 6
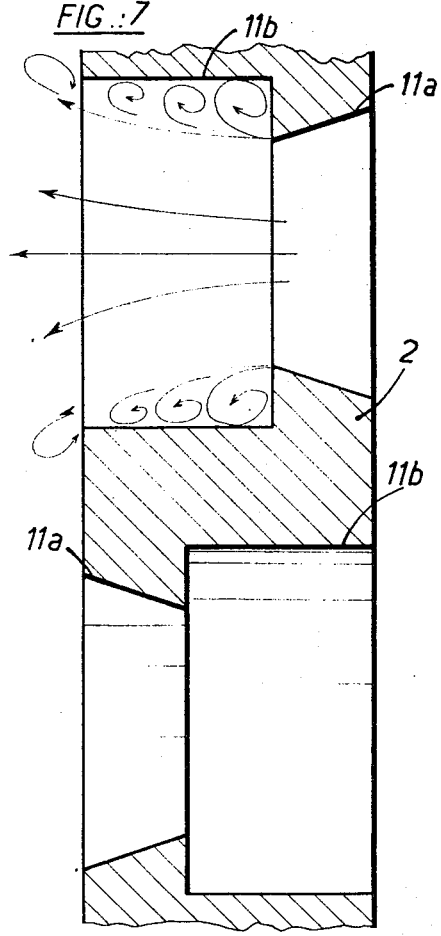
FIG.: 7
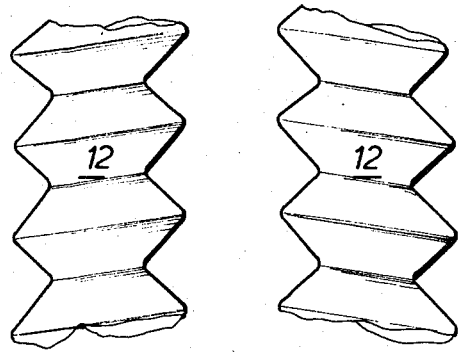
FIG.: 11

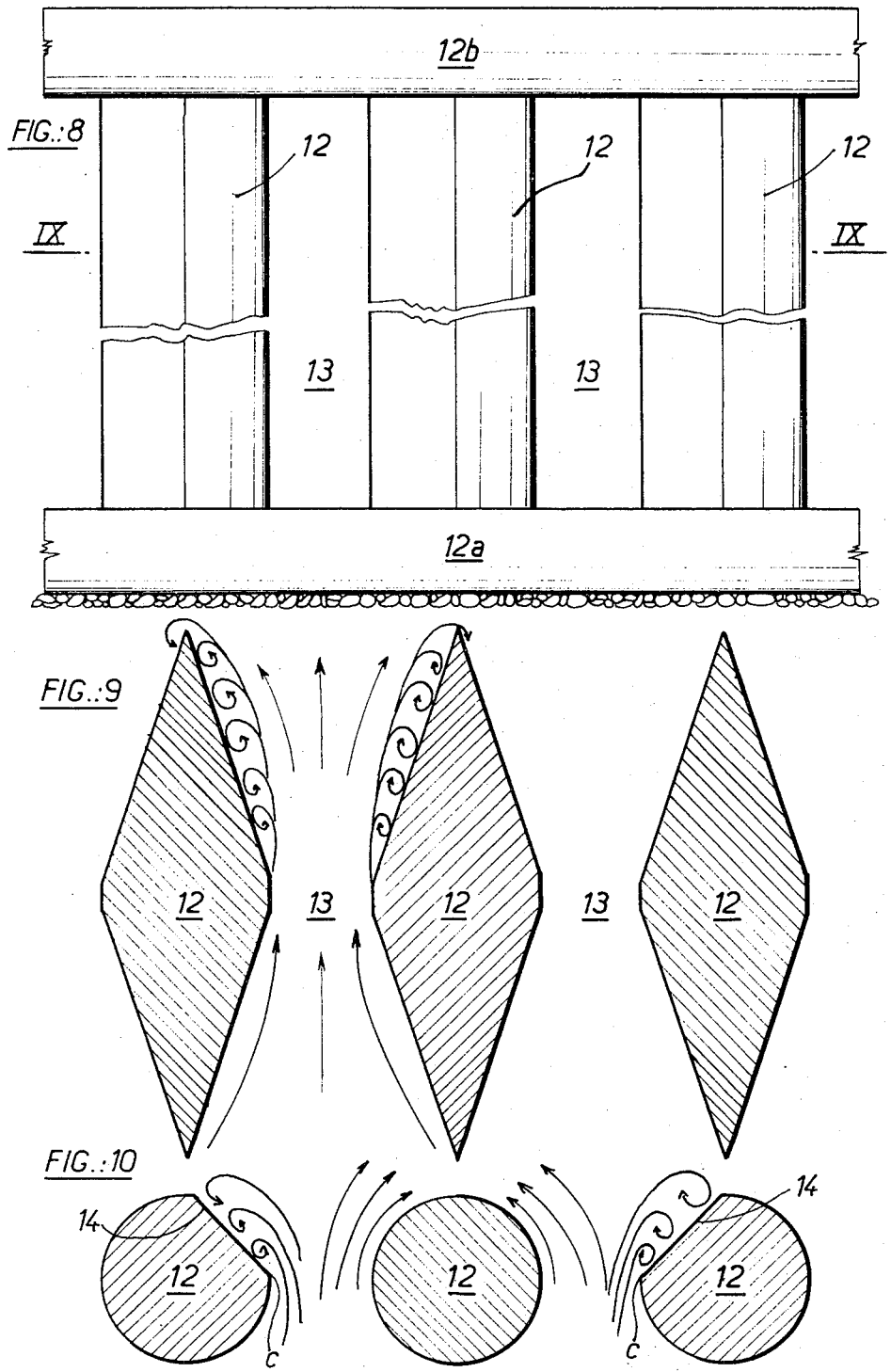

SWELL DAMPER

The invention relates to apparatus to lessen the effects of swell.

In order to protect structures such as dikes or breakwaters or again maritime installations such as reservoirs, it has already been proposed that there should be arranged in front of a solid wall, in a position substantially parallel thereto and on the side adjacent the volume of water in which the swell develops, another wall which is perforated by a multiplicity of holes both above and below the mean level of the water.

These two walls thus form a kind of caisson which, by filling through these holes, absorbs the waves washing along the perforated wall and thereafter restores the water through the holes when the perforated wall is uncovered by the wave troughs.

This absorption and restoration of the water, with division of the flow amongst the holes, has the result that a major part of the wave energy is converted to heat of friction and turbulence, this bringing about degradation and decoordination of reflected waves.

It is thus possible in particular to attenuate the phenomenon of the addition of the amplitudes of the incident wave and the returning wave, a mechanism which can give rise to waves which are dangerous because of the amount of energy which they contain.

The present invention provides another means of dissipating the energy waves.

In accordance with the invention, a curtain, arranged at some distance from the structure or zone which is to be protected and with its bottom part immersed in the volume of water in which the swell is developing, provides ducts in a distributed arrangement for the passage of the water, the profiles of which have a flared form with quite a steep gradient of sections so that when the water is flowing in the direction in which the section of the duct increases, the streamlines break away from the duct wall, generating emergydissipating eddies.

The curtain may in fact be a wall, the ducts then being holes formed and distributed within said wall from its base to its top, or again an assembly of parallel pillars the spaces between which form the aforementioned ducts.

Since the system in accordance with the invention operates by degradation, that is to say dissipation of the kinetic energy of the water flowing through the ducts, it is advantageous that the kinetic energy developed at the expense of the potential energy of the water should be as large as possible, and accordingly the preferred embodiment is one in which the ducts have a convergent entry to increase the velocity thereby dissipating the kinetic energy.

The ducts can even have a convergent-divergent profile in order that each of them operates in both directions of transfer of the water, or again may have a simple flared form, this time however arranged in an alternate fashion so that in one direction of flow certain of the ducts are convergent and the others divergent.

In the case where the ducts are constituted by the intervals between parallel pillars, these pillars may also have a helical form so that the water is imparted complex motions which increase the energy dissipation.

The description which now follows in relation to the attached drawing given purely by way of non-limitative example, will indicate how the invention may be put into effect, the features disclosed both in the drawing and in the text forming, of course, part of said invention as defined in the appended claims.

FIG. 1 is a transverse section through a dike or breakwater, with the protective device in accordance to the invention. The figure is purely diagramatic and is not to any particular scale.

FIG. 2 is a plan view of the FIG. 1 arrangement.

FIG. 3 illustrates in section on a larger scale, part of curtain in accordance with the invention, constituted by a perforated wall.

FIG. 3a is a view similar to that of FIG. 3, showing a modification.

FIGS. 4 to 7 illustrate various embodiments of the holes or ducts in said wall.

FIG. 8 is an elevational view of a swell-damping curtain constituted by parallel columns.

FIG. 9 is a section through this on the line IX—IX.

FIG. 10 is a view similar to that of FIG. 9 showing a variant embodiment.

FIG. 11 is an elevational view of another embodiment.

In FIG. 1, a wall 1 of concrete or masonry can be seen, for example a harbour jetty, which is to be protected against the swell coming in from the right of the figure.

To achieve this, in the embodiment shown in the Figure there is erected at certain intervals $i$ from the wall 1, a wall 2 of a certain thickness, in the order of $1m$ for example, which wall 2 is pierced both above and below the mean level of the swell by a multiplicity of holes or ducts 4, certain of which, if not all, have a special profile designed to dissipate the energy of the water flowing through the ducts 4 in the rhythm of the swell.

It will be seen that when the crest of a wave arrives at the perforated wall 2, as schematically illustrated by FIG. 1 which is not to any particular scale, the water flows through the wall 2 not only through the holes or ducts 4 which are momentarily covered by the wave but also through holes or ducts 4 located lower down, right to the bottom of the wall 2 in fact, by virtue of the hydrostatic load; the reverse phenomenon takes place when the through of the wave reaches the perforated wall 2. Thus, water flows first in one direction and then in the other through the ducts 4 and the wall 2 can, advantageously, be sufficiently high to ensure that it is not submerged even by the largest waves of the heaviest seas.

The profile of the ducts 4 can be a covergentdivergent profile, biconical in its simplest form (FIG. 3), with convergence and divergence angles of 2 $\alpha$ (angle at the edge of the cone in the case of a biconical profile) sufficiently large to ensure that in traversing the divergent portion, the streamlines break away from the wall of the duct, to produce eddies in the manner shown schematically in the duct at the bottom of FIG. 3.

These eddies dissipate energy.

Because of the fact that the ducts are of convergent-divergent form, this energy dissipation takes place not only during transit of the water through the wall 2 towards wall 1, but also in the reverse direction.

It will be seen, therefore, that this system in effect converts the wave energy into kinetic energy at the entrance to the ducts 4 and dissipates this kinetic energy by the generation of eddies and heat in the terminal part of said ducts 4.

In the embodiment shown in FIG. 3, the convergent part 7 of the ducts, that is to say the part first traversed by the water, aids to dissipate the wave energy since it increases the velocity of the water and therefore its kinetic energy.

If we call small e the thickness of the wall 2, R the radius of the entry orifice of a duct and r the radius of the throat, and if for example the throat is at the centre of the wall thickness (symmetrical duct), then we have the relationship:

$$R - r = e/2 \, tg\alpha$$

If, moreover, it is sought to achieve a velocity at the throat of twice the entry velocity, this corresponding to a fourfold increase in kinetic energy in the convergent section, then the following relationship is obtained between R and r:

$$R = r \sqrt{2}$$

If, for example we take $e = 1$ m and $R = 0.50$ m, the two preceding relationships give us: $r = 0.35$ m and $tg\alpha = 0.3$, whence $\alpha = 17°$ ($2\alpha = 34°$), this being an adequate value in the case of divergent section to produce break-away of the liquid flow, generating eddies.

If it is simply sought to treble the kinetic energy at the throat, then we have $R = r \sqrt[4]{3}$ and we obtain $tg\alpha = 0.24$, $\alpha = 13°$, $2\alpha = 26°$.

If a larger throat radius is required, equal to 0.50 m for example, whilst maintaining a fourfold increase in the kinetic energy between entry and throat, then we obtain $R = 0.70$ m and $tg\alpha = 0.4$, whence $2\alpha = 44°$.

It will be seen that the angle $2\alpha$ can vary as required.

However, the angle should not be too large if in the case of waves propagating obliquely in relation to the wall, reflections from the zone of the convergent section struck by the obliquely arriving wave, are to be avoided.

The angle $2\alpha$ will generally range between 25° and 45° with a preferential value of 34° to 38°, the radius at the throat being in the order of 0.30 m to 0,50 m.

The interval $i$ between the two walls can be of the order of the wavelength of the swell or of a fraction of this wavelength. The wall 2 can be erected seperately from the work 1 being protected, as in the case of FIG. 1, or else upon a common foundation apron. The two walls could also be connected together by ties such as those marked 3.

Also illustrated in FIG. 1 is a partition 5 which connects together the two walls and is located close to the mean level of the swell. This partition, which can have a thickness of the same order as the wall 2, is also pierced by a multiplicity of ducts 6 distributed in the same way as those of the wall 2 and also having a divergent section of appropriate angle and preferably a convergent-divergent profile so that the water which is forced through these ducts during disturbances of the general water level in the gap between the two walls, also experiences dissipation of energy by reason of the same mechanism.

The ducts 4 and 6 can readily be produced by using conical sleeves 7, 8 (FIG. 3) for example of precast concrete, which, placed in position before pouring the concrete of the wall, serve as formwork elements, so to speak, and define the ducts. These concrete cones can also be equipped with flanges, of square shape for example, as shown at 9 and 10, which, by their juxtaposition maintain the cones 7 and 8 in position on top of one another and act furthermore as formwork elements for the creation of the wall.

numerous variant embodiments are possible.

Thus, for example, the axes of the ducts, instead or being perpendicular to the wall 1 as shown at A—A and B—B in FIGS. 1 and 3 could be directed obliquely thereto, as indicated at A—A or B—B in FIG. 3a, in order to reduce the impact of the water jets against the wall 1. In addition, the inclinations of the axes of the ducts could be reversed from one duct to the next as shown in FIG. 3a, that is to say with a duct having an axis A—A inclined in one direction being located adjacent a duct having an axis B—B, inclined in the reverse direction, producing as a consequence interference between the jets and therefore promoting dissipation of the energy which they contain.

Instead of producing convergent-divergent ducts, ducts with a single flare could be used, but disposed in an alternate fashion in the manner shown in FIG. 4, so that as the water passes through the wall 2 towards the wall 1, certain of the ducts have a convergent effect and others a divergent effect, and vice versa during the return flow of the water.

Other duct designs are conceivable without departing from the scope of the invention. For example, in FIG. 5 a duct profile can be seen which has a cylindrical portion 11 between the two portions of opposite conicites.

In FIG. 6, the section of a duct is square or rectangular instead of being circular.

Instead of a conical form, the ducts could also have a flared form after the fashion of the bell of a trumpet.

The ducts could also have a discontinuous surface and for example comprise two portions 11a and 11b of stepped diameters (FIG. 7) so that in one direction the flow experiences a sudden enlargement of the cross sectional area so that eddies are generated.

The curtain constituted by the wall 2 pierced by the holes, can be produced in forms other than those thus far described without departing from the scope of the invention. For example, it could be constituted by a plurality of parallel, vertical or horizontal columns or pillars. In the case of FIG. 8, the vertical pillars 12 are supported at their bases upon a submerged pedestal 12a and are linked together above the waves by a beam 12b (FIG. 8). These pillars define between one another gaps 13 of slot form whose sections offer to the water flow a divergent portion of wide angle, which generates eddies, as can be seen in the left hand portion of FIG. 9.

In FIGS. 8 and 9, the pillars are assumed to have a hexagonal section but their form could differ from this, and for example be circular as shown in FIG. 10.

The latter case lends itself well to the production of a certain obliquity in the water flow at the exit from the ducts, due to the YOUNG-COANDA effect.

For example, as FIG. 10 shows, the pillars can be given a section which exhibits an angular point $c$ in the neighbourhood of the throat at one side of the duct, by leaving the neighbouring pillar round at the other side of the same duct, the angular point being obtained for example by removing part of each pillar in order to leave a flat face 14 as indicated in FIG. 10.

The jet breaks away beyond the point $c$ and tends to adhere to the round profile of the neighbouring pillar, adopting an oblique direction.

These oblique directions can be reversed from one duct to the next by flatting only one pillar in every two, the flat faces being orientated in opposite directions.

FIG. 11 illustrates another embodiment in which the pillars have a screw form which, in addition to producing the said divergence effect, gives the fluid a velocity component parallel to the pillar axis. If the screws have their hands reversed from one pillar to the nest, the water streamlines passing through the interval between two pillars are split into two parts having reversed axial velocity components and this increases the formation of dissipative eddies.

It goes without saying of course that the embodiments described are purely examples and could be modified in particular by the substitution of equivalent techniques, without in so doing departing from the scope of the invention as defined in the appended claims.

I claim:

1. A swell-damping device for protecting a region against a swell developing in a volume of water, said device comprising means for establishing between said region and said volume of water in which the swell develops, a curtain having its base immersed in said volume of water and a pluralityy of ducts distributed over the surface of the curtain in order to pass the water through the curtain, said ducts having a profile flared towards said region with a sufficiently steep gradient of section for the water flowing from said volume of water into said region to break away from the wall of the duct and produce eddies which dissipate the water energy.

2. A device as claimed in claim 1, in which said ducts furthermore comprise a profile flared towards the volume of water in which the swell develops, with a sufficiently steep gradient of section for the water flowing from said region towards said volume of water to break away from the wall of the duct and produce eddies which dissipate the water energy.

3. A device as claimed in claim 1, comprising a plurality of further ducts each having a profile flared towards the volume of water in which the swell develops and exhibiting a sufficiently steep gradient of section for the water flowing through said further ducts from said region towards said volume of water, to break away from the wall of said further ducts and produce eddies which dissipate the water energy.

4. A device as claimed in claim 1, in which the curtain comprises a wall and the ducts comprise holes formed across said wall and distributed from the base to the top thereof.

5. A device as claimed in claim 1, in which said ducts have a convergent entry portion in order to increase the kinetic energy of the water flowing towards said region in said flared profile.

6. A device as claimed in claim 1, in which said region contains a structure comprising a wall, and the curtain is arranged in a position substantially parallel to the wall in order to form a perforated caisson in relation thereto.

7. A device as claimed in claim 6, in which said ducts comprise furthermore a profile flared towards the volume of water in which the swell develops and exhibiting a sufficiently steep gradient of section to ensure that the water flowing from said region towards said volume of water breaks away from the wall of the ducts and produces eddies which dissipate the water energy.

8. A device as claimed in claim 6, comprising a plurality of further ducts each having a profile flared towards the volume of water in which the well develops and exhibiting a sufficiently steep gradient of section to ensure that the water through said further ducts from said region towards said volume of water, breaks away from the walls of said further ducts to produce eddies which dissipate the energy of the water.

9. A device as claimed in claim 6, in which the top of the curtain is above the crest of the highest waves occuring in the volume of water where the swell develops.

10. A device as claimed in claim 9, comprising in the gap between the wall and the curtain, a substantially horizontal partition arranged substantially at the mean level of the volume of water in which the swell develops, and a plurality of passages formed through said partition, each passage having a profile flared in at least one direction with a sufficiently steep gradient of section to ensure that water flowing through said direction breaks away from the wall of the passage to produce eddies which dissipate the energy of the water.

11. A device claimed in claim 1, in which the flared profile is a divergent profile having a divergence angle ranging from around 25° to around 45°.

12. A device as claimed in claim 11, in which the divergence angle is comprised in the range from around 34° to around 38°.

13. A device as claimed in claim 1, in which the ducts have axes directed obliquely in relation to the surface of the curtain.

14. A device as claimed in claim 13, in which the axes of each duct is inclined in the opposite direction to that of its neighbours.

15. A device as claimed in claim 1, in which the curtain comprises a plurality of pillars and the ducts are formed by the gaps between them.

16. A device as claimed in claim 15, in which the pillars have polygonal sections.

17. A device as claimed in claim 15, in which each gap is defined between a semi-circular portion of one of said pillars and an adjacent pillar which exhibits an angle (c, in FIG. 10) defining in relation to said pillar with a circular section portion, a throat for the water flow passing through said gap.

18. A device as claimed in claim 17, in which said adjacent pillar has a flat portion downstream of said angle.

19. A device as claimed in claim 15, in which the pillars are of screw form.

20. A device as claimed in claim 19, in which each screw form pillar has the opposite hand to the screw form of each adjacent pillar.

* * * * *

UNITED STATES PATENT OFFICE
CERTIFICATE OF CORRECTION

Patent No. 3,846,988                 Dated November 12, 1974

Inventor(s) Jacques Edouard LAMY

It is certified that error appears in the above-identified patent and that said Letters Patent are hereby corrected as shown below:

In the ABSTRACT, line 8, "occuring" should be --occurring--.

Column 1, line 39, "emergydissipating" should be --energy-dissipating--.

Column 2, lines 49 and 50, "covergentdivergent" should be --convergent-divergent--.

Column 3, line 40, "0,50 m" should be --0.50 m--.

Column 4, line 3, "numerous" should be --Numerous--.

Column 5, line 8, "nest" should be --next--.

Column 5, line 25, "pluralityy" should be --plurality--.

Column 5, line 46, "wall" should be --walls--.

Column 6, line 9, "well" should be --swell--.

Signed and sealed this 18th day of March 1975.

(SEAL)
Attest:

RUTH C. MASON
Attesting Officer

C. MARSHALL DANN
Commissioner of Patents
and Trademarks